Aug. 5, 1924.  
H. N. OTT  
1,503,800  
OBLIQUE LIGHT DIAPHRAGM  
Filed May 25, 1923
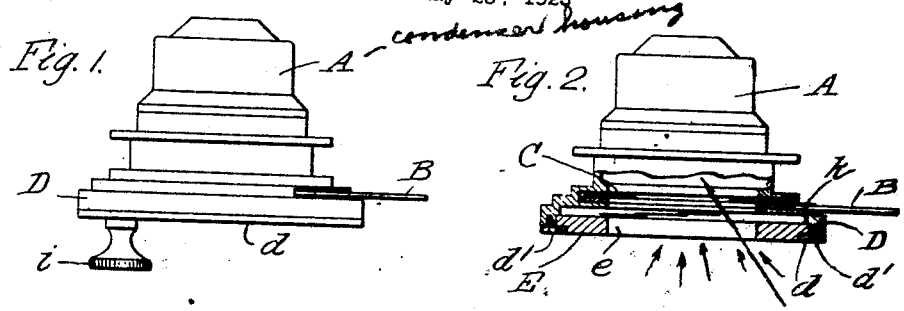
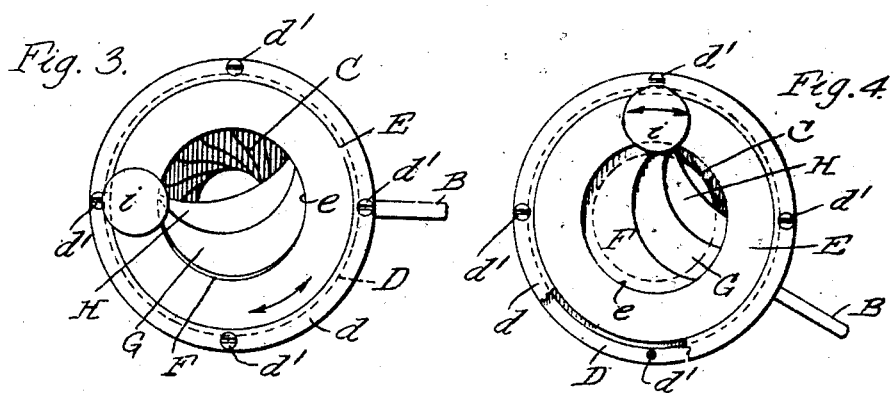
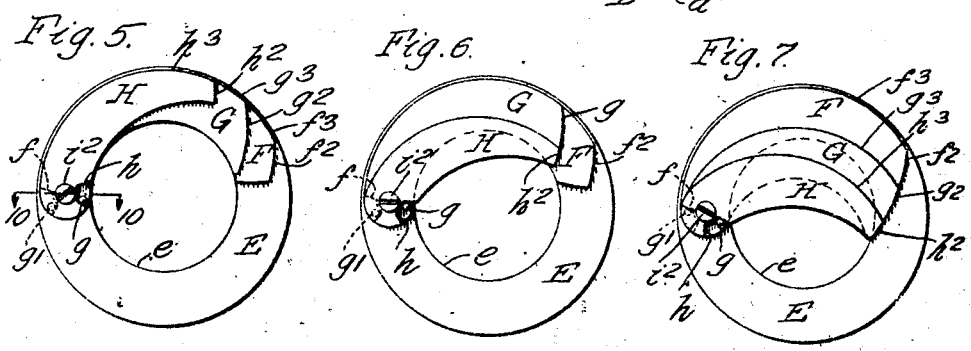
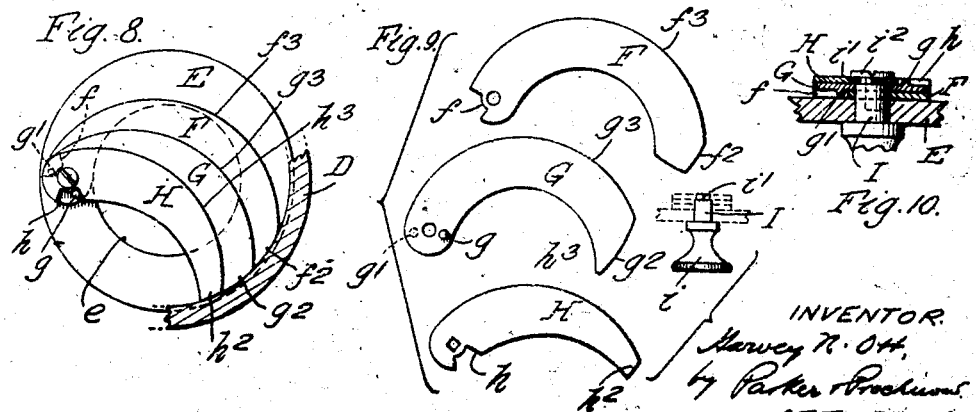
INVENTOR.  
Harvey N. Ott,  
by Parker Prochnow  
ATTORNEYS.

Patented Aug. 5, 1924.

1,503,800

UNITED STATES PATENT OFFICE.

HARVEY N. OTT, OF BUFFALO, NEW YORK, ASSIGNOR TO SPENCER LENS CO., OF BUFFALO, NEW YORK.

OBLIQUE-LIGHT DIAPHRAGM.

Application filed May 25, 1923. Serial No. 641,422.

*To all whom it may concern:*

Be it known that I, HARVEY N. OTT, a citizen of the United States, residing at Buffalo, in the county of Erie and State of New York, have invented a new and useful Improvement in Oblique-Light Diaphragms, of which the following is a specification.

This invention relates to diaphragms for use in connection with optical instruments for controlling the admission of light to parts of the instruments.

In microscopes and other optical instruments, it is frequently desirable to admit the light to the optical system at an angle to the optical axis of the instrument and heretofore this has generally been accomplished by providing some means for adjusting an iris diaphragm, which is used for controlling the amount of light admitted to the instrument, so that the iris diaphragm may occupy different eccentric positions. This manner of providing oblique illumination is, however, open to several objections.

The objects of this invention are to produce an oblique light diaphragm which may be used in conjunction with the usual iris diaphragm but which operates independently thereof; also to provide a diaphragm of this kind which is capable of admitting a greater amount of light to the object at an extreme angle than is possible with an eccentrically adjustable iris diaphragm heretofore used for this purpose; also to provide an efficient, comparatively inexpensive and quickly adjustable diaphragm for supplying light to an object at different angles and in varying amounts, and which adds very little to the amount of space required for the condenser; also to improve the construction of diaphragms of this kind in other respects hereinafter specified.

In the accompanying drawings:—

Fig. 1 is a side elevation of a condenser provided with the usual iris diaphragm and with a diaphragm embodying my invention for admitting light obliquely to the condenser.

Fig. 2 is a similar view thereof partly in section.

Figs. 3 and 4 are bottom plan views thereof showing the parts of the diaphragm in different positions.

Figs. 5, 6, 7 and 8 are top plan views of the oblique light diaphragm and supporting ring therefor removed from the other substage parts of the microscope.

Fig. 9 is a view showing the parts of the oblique light diaphragm separated from each other.

Fig. 10 is a fragmentary sectional elevation of the oblique light diaphragm, taken on line 10—10, Fig. 5.

Briefly stated, the oblique light diaphragm shown in the drawings includes a leaf or leaves which are movable across an opening through which light passes to the object, from one side of said opening toward the other side thereof, and means are provided for swinging the light diaphragm about the axis of the microscope so that the light may pass to the object from any desired angle of azimuth.

In the particular embodiment of the invention shown in the accompanying drawings, the oblique light diaphragm is applied to a condenser adapted to be releasably held on the substage of a microscope. A represents the housing of the condenser and B represents the lever or bar for controlling the usual iris diaphragm C used in connection with the condenser, and also mounted in the condenser housing. In order to accommodate the oblique light diaphragm, the condenser housing is provided with an annular extension or wall D which is adapted to engage the outer periphery of an annular support or base E on which the parts of the oblique light diaphragm are mounted, and a removable retaining ring $d$ is secured to the extension D of the condenser housing by means of screws of the like $d'$ to hold the oblique light diaphragm within the extension D of the condenser housing. Any other means for mounting the oblique light diaphragm on the substage of a microscope may be employed, if desired.

The oblique light diaphragm includes a plurality of leaves F, G and H which are superimposed upon each other and are adapted to be moved successively across the light opening $e$ in the annular supporting member E of the diaphragm. The leaves are so shaped that they may be swung out of the path of light to the condenser when the oblique light diaphragm is not in use. When oblique light is desired on the object on the microscope stage, these leaves are swung to different distances across the light opening $e$ in the annular support E. It will be understood, of course, that a single leaf could be used provided there were room enough to swing the same out of the path of the light passing through the hole $e$.

Means are provided for moving the leaves of the diaphragm successively across the light opening $e$ of the supporting ring E and for this purpose a pin I is preferably provided which has a head $i$ whereby the pin may be turned and the upper end of which, in the construction shown, is provided with a square end $i'$ adapted to fit into a corresponding hole in one of the diaphragm leaves, for example in the upper leaf H, so that this leaf will be turned with the pin I. As shown in Fig. 10, a screw $i^2$ is preferably used for holding the upper leaf H on the pin. This pin also extends loosely through holes in the other two leaves F and G and suitable connections are provided between the leaf which is attached to the pin I and the other leaves. In the construction shown for this purpose, the middle leaf G is provided with an upwardly extending pin or projection $g$ and a corresponding downwardly extending pin $g'$. The upper leaf H is provided with an arc-shaped slot $h$ into which the pin $g$ of the middle leaf is adapted to extend, and the slot terminates in shoulders with which the pin is adapted to engage. The lower pin $g'$ enters into a corresponding arc-shaped slot $f$ in the bottom leaf F and is also adapted to cooperate with shoulders in the end of this slot. These slots $f$ and $h$ and the pins $g$ and $g'$ are so positioned relatively to each other that when the upper leaf H is swung outwardly from the position shown in Fig. 5 by turning the pin I this leaf first moves across the light opening alone, as shown in Fig. 6, until the pin $g$ engages at one end of the slot $h$ in the upper leaf H, whereupon a further swinging of the leaf H across the light opening will cause the middle leaf G to swing with the upper leaf outwardly about the axis of the pin I, as shown in Fig. 7. After the pin $g'$ has moved to the limit of the slot $f$ in the bottom leaf F, then further movement of the upper and middle leaves H and G will also cause the bottom leaf F to swing across the light opening, as shown in Fig. 8. When the head $i$ is turned in the reverse direction to swing the diaphragm leaves out of the path of the light, the upper leaf H first moves rearwardly across the middle leaf and the pin $g$ engages the other end of the slot $h$ whereupon the middle leaf will be swung in the reverse direction. In a similar manner the bottom leaf is swung out of the path of the light by the engagement of the pin $g'$ in the other end of the slot $f$. By means of this arrangement the leaves of the diaphragm may be swung to any desired extent across the light opening in the leaf supporting ring E, thus controlling the degree of obliqueness or angle of the light passing through the condenser to the object.

It is desirable to provide means for limiting the swinging of the leaves across the light opening so that none of the leaves will swing beyond its final position, and these means may be of any suitable construction. In the particular embodiment of the invention shown in the drawings, the outer ends $f^2$ $g^2$ and $h^2$ of the leaves are so shaped as to engage the inner face of the extension D of the condenser housing when the leaves reach their final positions across the light opening. The back edges $f^3$ $g^3$ and $h^3$ limit the swinging of the leaves in the opposite direction by contacting with the inner face of the extension D of the housing and when the leaves are in this position, the front edges thereof will be at or near the edge of the light opening $e$ so as not to obstruct the passage of light to the condenser.

In addition to controlling the angularity of the light by means of the oblique light diaphragm, it is also desirable to provide means for admitting light to the condenser from any desired angle of azimuth, and for this purpose, in the construction shown, the supporting ring E of the oblique light diaphragm is rotatably arranged on the extension D of the condenser housing, the removable retaining ring $d$ and a shoulder $k$ of the extension D of the condenser housing serving to confine the supporting ring E in such a manner as to permit the adjustment of the same about the axis of the condenser. Consequently the head $i$ of the pin I may also be used for turning the supporting ring into different positions, as is shown in Figs. 3 and 4, to admit light from different angles of azimuth.

The oblique light diaphragm described is compact in arrangement and requires very little additional space on the condenser and may be used in connection with the iris diaphragm so that both of these diaphragms perform their usual functions independently of each other and at the same time cooperate with each other to produce the desired effects. The oblique light diaphragm has the advantage over the iris diaphragms heretofore used which were adjustable eccentrically with reference to the axis of the microscope in that a larger amount of light may be admitted to the condenser at an extreme angle than was possible with iris diaphragms heretofore used for producing oblique light on the object.

The invention has been herein described as applied to the condenser of a microscope, but it will be understood that it is not intended thereby to limit the use of this invention to condensers, since the oblique diaphragm may be used in connection with other optical instruments for the purpose of admitting light obliquely thereto.

I claim as my invention:—

1. An oblique light diaphragm for use on optical instruments, including a plurality of leaves which are movable into an inoperative position out of the path of light in which said leaves are arranged one directly above another, and which are movable successively toward the center of the path of light, each of said leaves being adapted to be positioned at a different distance from said center.

2. An oblique light diaphragm for use on optical instruments, including a plurality of connected leaves adjustable to different positions transversely across the path of light to the object, each of said leaves being movable to a different distance from the center of the path of light.

3. An oblique light diaphragm for use on optical instruments, including a member supported on said instrument to turn about the axis of the instrument and having an opening through which light may pass, and a leaf pivotally mounted on said member and adjustable about its pivot to different positions across said opening from one side thereof toward the other side.

4. An oblique light diaphragm for use on optical instruments, including a ring supported on said instrument to rotate about the axis of the instrument and having an opening through which light may pass, and leaves mounted on said ring to swing about a common pivot across said opening.

5. The combination with an optical instrument including a housing, of an oblique light diaphragm, including a ring mounted in said housing and having an opening through which light may pass, and a diaphragm leaf pivoted on said ring and adapted to be moved across said opening from one side thereof toward the opposite side.

6. The combination with an optical instrument including a housing, of an oblique light diaphragm, including a ring adjustably mounted on said housing and adapted to be turned into different positions about the axis of said housing, said ring having an opening through which light may pass, and a leaf pivoted on said ring and adapted to be moved about its pivot into different positions on said ring transversely of said opening from one side thereof toward the opposite side.

7. The combination with an optical instrument having a housing provided with an annular wall portion, a ring adjustably mounted in said annular wall portion and adapted to be moved to different positions about the axis of said housing, and an oblique light diaphragm pivoted on said ring and adjustable about its pivot to different positions across a light opening in said ring from one side of said opening toward the opposite side thereof.

8. An oblique light diaphragm for use on optical instruments, including a plurality of leaves, a pin on which one of said leaves is secured and which may be turned to move said leaf transversely across the path of light, and a connection between said leaf and other leaves whereby said other leaves may be moved transversely of the path of light by said first-mentioned leaf.

9. An oblique light diaphragm for use on optical instruments, including a plurality of leaves pivotally mounted with reference to the instrument, means for moving one of said leaves transversely across the path of light, and a connection between said leaf and another leaf whereby said first mentioned leaf may cause said other leaf to move across said path of light.

10. An oblique light diaphragm for use on optical instruments, including a plurality of leaves pivotally mounted with reference to the instrument, means for moving one of said leaves transversely across the path of light, and a pin on another leaf adapted to engage a portion of the first leaf after a limited movement thereof, whereby a part of the movement of said first leaf will be transmitted to said other leaf.

11. An oblique light diaphragm for use on optical instruments, including a plurality of leaves pivotally mounted with reference to the instrument and movable transversely across the path of light, means for swinging one of said leaves across said path of light, a connection between said leaf and another leaf for causing said first leaf to move said other leaf after a limited movement of said first leaf, and means for stopping the movement of said leaves, said stop means being arranged to stop said leaves in different positions transversely of said path of light.

12. The combination with an optical instrument having an annular wall portion, an oblique light diaphragm mounted in said annular wall portion and including a plurality of leaves adapted to swing transversely of the path of light and about a common center, connections between said leaves, whereby the swinging of one of said leaves will cause the other leaves to swing into different successive positions across said path of light, and parts on said leaves adapted to engage said annular wall portion to stop said leaves in different successive positions across said path of light.

HARVEY N. OTT,